UNITED STATES PATENT OFFICE.

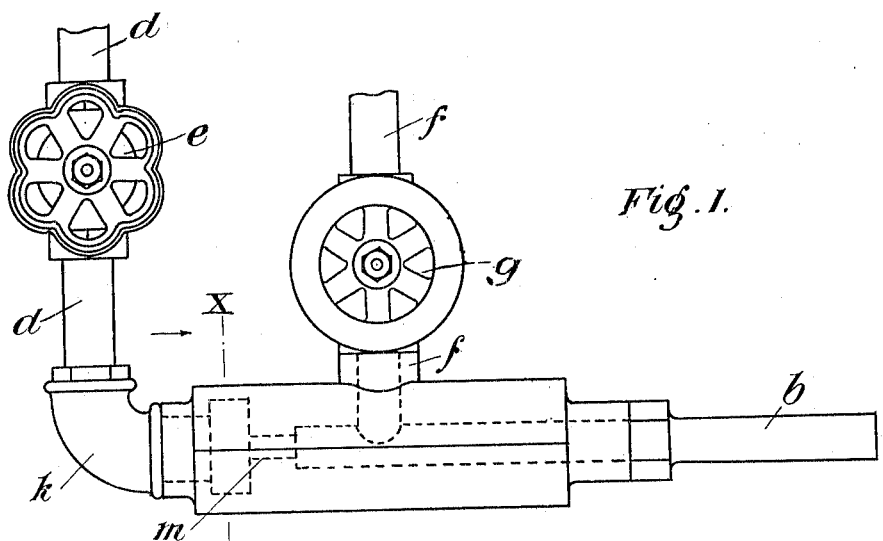
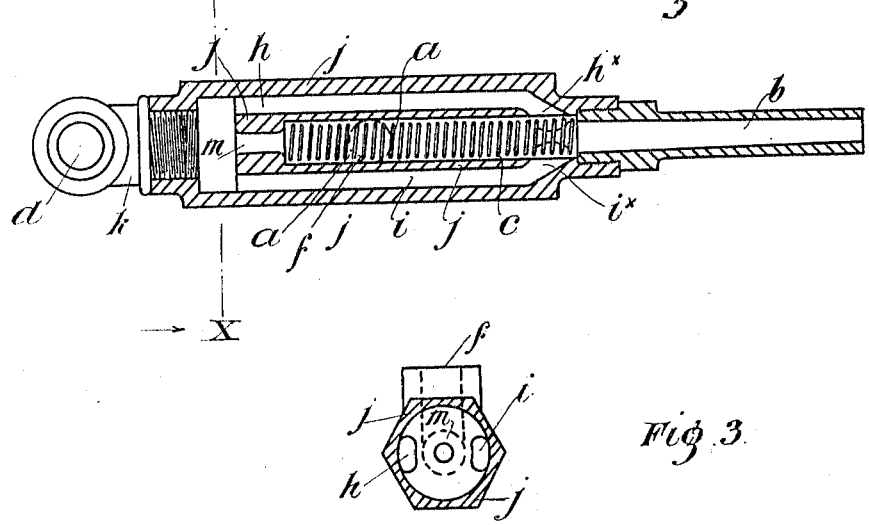
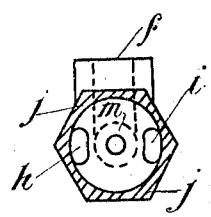

SAMUEL WILLIAM PRICE, OF LONDON, ENGLAND.

APPARATUS FOR BURNING LIQUID FUEL.

1,105,833.  Specification of Letters Patent.  Patented Aug. 4, 1914.

Application filed September 16, 1913. Serial No. 789,984.

*To all whom it may concern:*

Be it known that I, SAMUEL WILLIAM PRICE, a subject of the King of Great Britain, residing at 13 Great Queen street, London, England, metal refiner, have invented new and useful Improvements in Apparatus for Burning Liquid Fuel, of which the following is a specification.

This invention relates to improvements in liquid fuel burner apparatus of the kind which consists of a tubular mixing chamber with compressed air or steam inlet at one end and a T branch for the admission of the oil or other liquid fuel through a regulating valve or cock from an elevated tank by gravity to the said mixing chamber which also contains a simple helical coil of wire. When such an apparatus is worked with steam or air above a certain pressure there is a tendency for such pressure to act upon the oil as it flows into the tubular mixing chamber and to drive it back, and thereby arrest its flow, and consequently stop the efficient action of the burner, this being more especially the case where refined oils are employed.

The object of my present improvement is to overcome this objection and to enable the apparatus to be used with steam or air at a higher pressure than is possible at present, and also to enable it to be used with steam or air at varying pressures, which could not be satisfactorily done with the burner referred to. For these purposes I form an enlarged chamber at the inlet end of the apparatus and a contraction at the inlet end of the mixing chamber by reducing the internal diameter for a convenient distance between the said inlet end of the mixing chamber and the point where the oil is introduced into the said chamber. I also form two or more separate steam or compressed air passages in the wall of the mixing chamber from the before mentioned enlarged chamber to a point at a convenient distance from the outlet end of the mixing chamber, at which point I cause the passages to enter the said chamber.

In the accompanying drawing Figure 1 is an elevation of my improved burner; Fig. 2 is a longitudinal section of Fig. 1; and Fig. 3 is a transverse section on line X—X of Figs. 1 and 2.

$a$ is the mixing chamber, $b$ the outlet nozzle, $c$ the helical wire coil, $d$ the inlet pipe for steam or compressed air, the flow of which is controlled by the regulating valve $e$, and $f$ is the inlet pipe for oil the flow of which is controlled by the regulating valve $g$.

$h$ and $i$ are two separate steam or compressed air passages formed in the wall $j$ of the mixing chamber $a$ and $n$ is the enlarged chamber.

At the inlet end of the apparatus $a$ I provide the usual elbow or other fitting $k$ for the introduction of steam or compressed air, which fitting communicates through the enlarged chamber $n$ and the contracted orifice $m$ with the central passage of the mixing chamber $a$, and also with the two or more auxiliary passages $h$ and $i$ in such a manner that, when the steam or compressed air valve $e$ is turned on, it admits steam or compressed air into the mixing chamber $a$ through the contracted central orifice $m$, and also through the two or more auxiliary passages $h$ and $i$, thereby dividing the current of steam or compressed air, which passes partly through the central mixing chamber $a$ and directly to the outlet nozzle $b$, and mixes intimately with the oil which has entered the mixing chamber $a$ through the oil inlet $f$, and partly through the auxiliary passages $h$ and $i$ entering the mixing chamber $a$ and mingling with the mixture of steam or compressed air and oil at the points $h^x$ and $i^x$ between the oil inlet $f$ and the outlet nozzle $b$.

In Fig. 2 the outlet nozzle $b$ is shown screwed into the end of the mixing chamber $a$, and with this arrangement not only may nozzles of various sizes be employed with one mixing chamber, but the inner end of the removable nozzle $b$ serves to keep the helical wire coil $c$ in place. But in cases where the burner and nozzle are made in one casting, the helical wire coil $c$ may be introduced from the outlet end of the nozzle $b$, and may be retained in place by means of a pin passing through holes in the walls of the mixing chamber, or by any other convenient form of abutment or stop.

By the employment of my improved apparatus I am enabled to use oils either of a highly refined or exceedingly crude description.

Claims.

1. A liquid fuel burning apparatus comprising a central compartment forming a tubular mixing chamber, a contracted inlet at the inner end thereof for an atomizing fluid under pressure, separate passages in the wall of the said mixing chamber communicating with said inlet and with the outlet of said mixing chamber, a branch inlet for the liquid fuel into the middle portion of the central compartment of the said mixing chamber, and a helical coil of wire in the said central compartment, substantially as described.

2. A liquid fuel burning apparatus comprising a central compartment forming a tubular mixing chamber, a contracted inlet at the inner end thereof for an atomizing fluid under pressure, separate passages in the wall of the said mixing chamber communicating with said inlet and with the outlet of said mixing chamber, and a branch inlet for the liquid fuel into the middle portion of the central compartment of the said mixing chamber, substantially as described.

In testimony whereof I have signed my name to this specification in the presence of two subscribing witnesses.

SAMUEL WILLIAM PRICE.

Witnesses:
STEPHEN EDWARD MUNYON,
WILLIAM ANDERSON SMITH.

---

Copies of this patent may be obtained for five cents each, by addressing the "Commissioner of Patents, Washington, D. C."